July 14, 1931.  W. I. TYCER  1,814,870
CERAMIC VESSEL AND METHOD OF PRODUCING THE SAME
Filed May 28, 1928
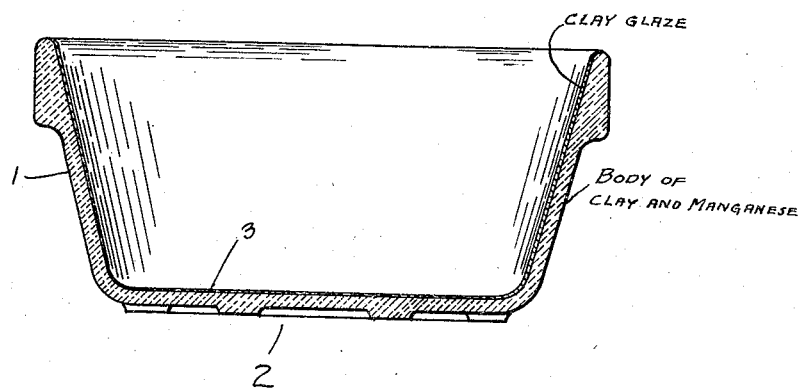
Inventor
Warren I. Tycer
by
W. S. McDowell
Attorney Patented July 14, 1931

1,814,870

UNITED STATES PATENT OFFICE

WARREN I. TYCER, OF COLUMBUS, OHIO

CERAMIC VESSEL AND METHOD OF PRODUCING THE SAME

Application filed May 28, 1928. Serial No. 281,004.

This invention relates to an improved earthenware receptacle and method of producing the same, and is particularly directed to the manufacture of fire clay cooking utensils.

An outstanding object of the invention resides in the production of earthenware vessels which are capable of withstanding without damage sudden changes in temperature, of materials impervious to the deleterious action of acids and of such strength and durability as to minimize breakage or injury to the vessels during the period of handling or transportation.

Another object of the invention resides in producing earthen cooking vessels or other similar receptacles wherein the body of the receptacle is formed from clay admixed with a relatively small percentage of manganese, whereby the body of the receptacle, when fired, is given a durable and tenacious structure possessing both strength and high heat conductivity, whereby a vessel is produced from ceramic materials possessing many properties of superiority in comparison with ordinary earthenware vessels of this kind.

It is a further object of the invention to form the body of the vessel from a single composite layer of clay and manganese and to provide a thin inner glaze or slip around the interior surfaces of the vessel which glaze is of such color and formation as to produce a smooth, vitreous surface capable of resisting the attacks of acid and at the same time of such formation as to completely conceal the ground manganese present in the body layer or wall of the vessel.

In the accompanying drawing, the single figure represents in vertical section of an earthenware receptacle formed in accordance with the present invention.

In carrying out the invention, the body or wall 1 of the receptacle 2 disclosed in the drawing is compounded from a mixture consisting of, for example, four (4) pounds of "top-fire" clay, a high heat resisting clay, three (3) pounds of "lower-vein" clay and one (1) pound of "sand stone" clay. These materials are mixed with a relatively small quantity, for example, two (2) ounces of powdered manganese, and the entire mixture is then thoroughly ground and mixed together with water in a pug mill or mixer, and by customary operations the potter then molds the same into receptacles of desired contour or form, as indicated in the drawing.

While the manganese, which has been added to the clays composing the body has the effect of providing for greater strength, durability, improved thermo-conductivity and transference it does not burn smoothly when placed in a kiln and subjected to the heat thereof. It is therefore necessary to apply a glaze or slip to the interior of the receptacle, as indicated at 3.

In prior methods it has been proposed to employ a receptacle consisting of an outer stratum of clay mixed with manganese and an inner stratum of a fine grade of clay adapted for the reception of a glaze. By the present invention the use of this inner layer of fine clay in the construction of the body or wall of the utensil is eliminated, and a method provided by which the glaze may be directly applied to the manganese containing clay and a very satisfactory form of receptacle produced.

To accomplish this I apply to the inner surface of the body 1, a short time after the latter has been molded into receptacle form, a glaze or slip composed of Michigan and Albany clays suitably mixed with water to produce a glaze of desired consistency. This slip or glaze is then applied to the inner surfaces of the manganese clay body and the ware is then placed in a kiln and is burned from 54 to 60 hours and subjected to a temperature ranging up to 2600 degrees Fahrenheit.

When the ware is removed from the kiln it possesses an outer body usually of a light brown color speckled with the black powder manganese, which is uniformly distributed throughout all portions of the outer clay body. The slip or glaze, after firing, presents a deep black color, providing a fine smooth acid resisting vitreous surface of a glass-like finish, and by reason of the color of the glaze and the character of the materials used therein a smooth uninterrupted surface of the character set forth is produced on the inner surface of the body which is devoid of roughness, irregularities or unevenness, which is usually present in glaze coated manganese containing clays.

What is claimed is:

1. A ceramic vessel of the character set forth comprising a body structure containing powdered manganese, the manganese being worked into the clay to become an integral part thereof, and a glaze composed of Michigan and Albany clay applied to the inner surfaces of the manganese clay body and integrally fused thereto, said glaze producing a black smooth surface of glass-like formation around the inner surface of the utensil completely covering and concealing the outer manganese clay body.

2. A method of producing fire-clay cooking receptacles which consists in mixing one-eighth part of sandstone clay, one-half part of fire-clay and three-eighths part of lower vein clay with a relatively small quantity of powdered manganese by means of a pug mill or mixer and for a sufficient period of time and with sufficient water to produce a plastic clay body of uniform materials throughout capable of being molded into desired form, molding said materials into receptacle form, and then applying to the interior of said receptacle liquid glaze consisting of Michigan and Albany clay, which after firing, produces a black vitreous surface upon the interior of the receptacle of such opacity as to conceal the manganese in the outer clay body.

3. A method of producing fire-clay cooking receptacles which consists in mixing one-eighth part of sandstone clay, one-half part of fire-clay and three-eighths part of lower vein clay with a relatively small quantity of powdered manganese by means of a pug mill or mixer and for a sufficient period of time and with sufficient water to produce a plastic clay body of uniform materials throughout capable of being molded into desired form, molding said materials into receptacle form and then applying to the interior of said receptacle liquid glaze consisting of Michigan and Albany clay, then subjecting the same to kiln temperatures ranging between 2375° F. and 2400° F., which liquid glaze after firing produces a black vitreous surface upon the interior of the receptacle of such opacity as to conceal the manganese in the outer clay body.

4. A ceramic vessel of the character set forth comprising a body structure containing 4 pounds of "top-fire" clay, 3 pounds of lower vein clay and 1 pound of sandstone clay, with a slight mixture of powdered manganese, the manganese being worked into the clay to become an integral part, and a glaze composed of Michigan and Albany clay applied to the inner surfaces of the manganese clay body and integrally fused thereto, said glaze producing a black smooth surface of glass-like formation around the inner surface of the vessel completely covering and concealing the outer manganese clay body.

In testimony whereof I affix my signature.

WARREN I. TYCER.